United States Patent
Mizuno (10) Patent No.: US 12,152,877 B2
(45) Date of Patent: Nov. 26, 2024

(54) ROTATION ANGLE DETECTION APPARATUS

(71) Applicant: DENSO CORPORATION, Kariya (JP)

(72) Inventor: Fumiaki Mizuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 171 days.

(21) Appl. No.: 17/659,155

(22) Filed: Apr. 13, 2022

(65) Prior Publication Data

US 2022/0236046 A1  Jul. 28, 2022

Related U.S. Application Data (63) Continuation of application No. PCT/JP2020/034735, filed on Sep. 14, 2020.

(30) Foreign Application Priority Data

Oct. 15, 2019 (JP) .................. 2019-188329

(51) Int. Cl.
*G01B 7/30* (2006.01)
*G01B 7/004* (2006.01)

(52) U.S. Cl.
CPC ............... *G01B 7/30* (2013.01); *G01B 7/004* (2013.01)

(58) Field of Classification Search
CPC .................. G01B 7/30; G01B 7/004
See application file for complete search history.

(56) References Cited

U.S. PATENT DOCUMENTS

| | | | |
|---|---|---|---|
| 4,963,733 A | 10/1990 | Spaulding | |
| 5,321,455 A * | 6/1994 | Cocca | G03B 17/30 242/348 |
| 5,497,213 A * | 3/1996 | Yoshida | G03B 7/24 396/207 |
| 5,541,681 A * | 7/1996 | Cocca | G03B 17/30 396/389 |
| 5,574,364 A * | 11/1996 | Kajimoto | G01D 5/2457 324/207.21 |

(Continued)

FOREIGN PATENT DOCUMENTS

| | | |
|---|---|---|
| JP | H07-043134 A | 2/1995 |
| JP | 2015-224955 A | 12/2015 |
| JP | 2016-176743 A | 10/2016 |

*Primary Examiner* — Walter L Lindsay, Jr.
*Assistant Examiner* — Milton Gonzalez
(74) *Attorney, Agent, or Firm* — MASCHOFF BRENNAN (57) ABSTRACT

A rotation angle detection apparatus includes an incremental rotary scale and a detector. The rotary scale includes both a detection region having a scale formed therein for detecting a rotation angle of an object and a non-detection region having no scale formed therein. The detector generates, based on an input signal indicating change in the position of the scale of the detection region which changes according to change in the rotation angle of the object, an electrical signal that periodically changes according to the change in the position of the scale of the detection region. Further, the detector detects the rotation angle of the object based on the electrical signal. Furthermore, the detector detects a reference angle for the rotation angle of the object by counting the number of positional changes from an end of the scale of the detection region; the positional changes are indicated by the input signal.

7 Claims, 9 Drawing Sheets

(56) References Cited

U.S. PATENT DOCUMENTS

| | | | | | |
|---|---|---|---|---|---|
| 5,666,572 | A | * | 9/1997 | Tsuji | G03B 7/24 |
| | | | | | 396/207 |
| 5,671,456 | A | * | 9/1997 | Tsuji | G03B 17/425 |
| | | | | | 396/410 |
| 5,812,894 | A | * | 9/1998 | Yoshida | G03B 17/425 |
| | | | | | 396/207 |
| 5,815,751 | A | * | 9/1998 | Ogino | G03B 17/30 |
| | | | | | 396/207 |
| 5,825,008 | A | * | 10/1998 | Siemer | G06K 7/10851 |
| | | | | | 235/462.14 |
| 5,940,638 | A | * | 8/1999 | Kim | G03B 17/30 |
| | | | | | 396/207 |
| 5,969,322 | A | * | 10/1999 | Mori | G03B 17/30 |
| | | | | | 235/494 |
| 9,537,956 | B1 | | 1/2017 | Sibenac et al. | |
| 2015/0123589 | A1 | | 5/2015 | Matsutani | |

* cited by examiner

ROTATION ANGLE DETECTION APPARATUS

CROSS-REFERENCE TO RELATED APPLICATIONS

The present application is a continuation application of International Application No. PCT/JP2020/034735 filed on Sep. 14, 2020, which is based on and claims priority from Japanese Patent Application No. 2019-188329 filed on Oct. 15, 2019. The entire contents of these applications are incorporated by reference into the present application.

BACKGROUND

1 Technical Field

The present disclosure relates to rotation angle detection apparatuses.

2 Description of Related Art

In incremental rotation angle detection apparatuses, code wheels (see, for example, Japanese Patent Application Publication No. JP H07-43134 A) are widely used which include both a scale dedicated for detection of a rotation angle and a scale dedicated for detection of a reference angle. The scale dedicated for detection of the rotation angle is provided over the entire circumference of the code wheel in the circumferential direction. On the other hand, the scale dedicated for detection of the reference angle is provided at a single reference position in the circumferential direction.

SUMMARY

A scale dedicated for detection of a reference angle is generally required to be accurately formed. Therefore, compared to a code wheel with only one scale dedicated for detection of a rotation angle, a code wheel with two types of scales (i.e., a scale dedicated for detection of a rotation angle and a scale dedicated for detection of a reference angle) is more difficult to form, larger in size and higher in cost. Moreover, a rotation angle detection apparatus employing a code wheel with two types of scales is generally required to have both a circuit dedicated for detection of the rotation angle and a circuit dedicated for detection of the reference angle; therefore, such a rotation angle detection apparatus is larger in size and higher in cost than a rotation angle detection apparatus employing a code wheel with only one scale dedicated for detection of the rotation angle. Hence, it is desired to detect both a rotation angle and a reference angle with a compact and low-cost configuration.

The present disclosure has been accomplished in view of the above circumstances.

According to the present disclosure, there is provided a rotation angle detection apparatus for detecting a rotation angle of an object. The rotation angle detection apparatus includes an incremental rotary scale and a detector. The rotary scale is configured to rotate together with the object and includes both a detection region and a non-detection region. The detection region is provided along a circumferential direction of the rotary scale and has a scale formed therein for detecting the rotation angle of the object. The non-detection region adjoins the detection region in the circumferential direction and has no scale formed therein. The detector is configured to generate an electrical signal based on an input signal and detect the rotation angle of the object based on the electrical signal. The input signal indicates change in the position of the scale of the detection region. The position of the scale of the detection region changes according to change in the rotation angle of the object. The electrical signal periodically changes according to the change in the position of the scale of the detection region. Moreover, the rotary scale has no scale dedicated for detection of a reference angle for the rotation angle of the object. The detector is further configured to detect the reference angle by counting the number of positional changes from an end of the scale of the detection region of the rotary scale; the positional changes are indicated by the input signal.

In the above rotation angle detection apparatus according to the present disclosure, the rotary scale has the scale formed in the detection region thereof for detecting the rotation angle of the object, but no scale dedicated for detection of the reference angle for the rotation angle of the object. The detection region is provided along the circumferential direction of the rotary scale so as to match the angle range of the rotation angle of the object which is less than one revolution (i.e., less than 360°). The detector generates, based on the input signal indicating change in the position of the scale of the detection region, the electrical signal that periodically changes according to the change in the position of the scale of the detection region; the position of the scale of the detection region changes according to change in the rotation angle of the object. Further, the detector detects the rotation angle of the object based on the electrical signal. Furthermore, the detector detects the reference angle by counting the number of positional changes from an end of the scale of the detection region of the rotary scale; the positional changes are indicated by the input signal. That is, the detector detects the reference angle based on the number of periodical changes of the electrical signal, which changes according to the change in the position of the scale of the detection region, with respect to a boundary position between the detection region and the non-detection region. Consequently, it becomes possible to detect both the rotation angle of the object and the reference angle with a compact and low-cost configuration.

DESCRIPTION OF EMBODIMENTS

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, explanation of identical components will not be repeated.

First Embodiment

Figure 1:
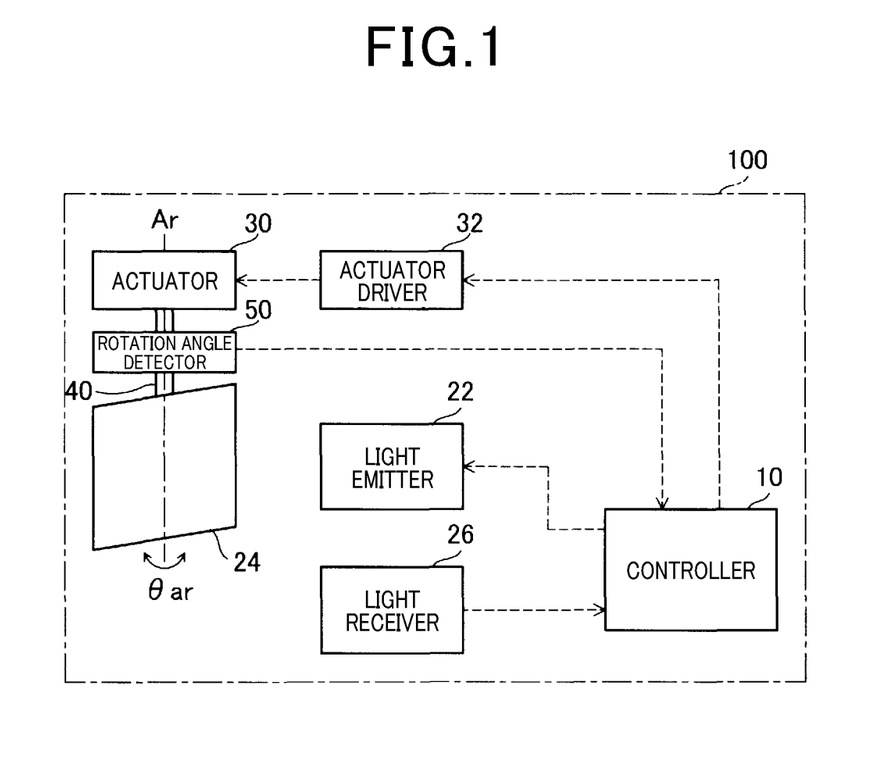
FIG. 1 is a schematic diagram illustrating the overall configuration of an object detection apparatus which includes a rotation angle detection apparatus according to a first embodiment.

FIG. 1 illustrates the overall configuration of an object detection apparatus 100 which includes a rotation angle detection apparatus according to the first embodiment.

In the present embodiment, the object detection apparatus 100 is configured as a Lidar (Light Detection and Ranging) apparatus. As shown in FIG. 1, the object detection apparatus 100 includes a controller (or control unit) 10, a light emitter (or light emitting unit) 22, a rotating body (or rotating member) 24, a light receiver (or light receiving unit) 26, an actuator 30, an actuator driver (or actuator driving unit) 32 and a rotation angle detector (or rotation angle detection unit) 50.

The controller 10 may be implemented by, for example, a microprocessor, an FPGA (Field-Programmable Gate Array), an ASIC (Application-Specific Integrated Circuit) or an SoC (System-on-Chip). Although not shown in the drawings, the controller 10 includes an operation unit, a storage unit and an input/output unit. The controller 10 controls, through execution by the operation unit of various programs stored in the storage unit, operation of the actuator 30 according to the rotation angle of the rotating body 24 detected by the rotation angle detector 50.

In addition, the actuator 30 is provided to drive the rotating body 24 that rotates together with a rotating shaft 40. Since the azimuth of an object is detected through rotation of the rotating body 24, the rotation angle of the rotating body 24 may also be referred to as the azimuth angle.

The controller 10 further controls emission timing at which light is irradiated by the light emitter 22. The irradiated light may be transmitted, via the rotating body 24, to an object and then reflected by the object to form reflected light. In this case, the controller 10 calculates the distance from the object detection apparatus 100 to the object based on the time from when the irradiated light is emitted from the light emitter 22 until the reflected light is received by the light receiver 26.

The controller 10 is connected to the light emitter 22, the light receiver 26, the actuator driver 32 and the rotation angle detector 50 via signal lines. The controller 10 receives signals outputted from the light receiver 26 and the rotation angle detector 50. Moreover, the controller 10 sends control signals to the light emitter 22 and the actuator driver 32.

The actuator 30 is configured to rotationally drive the rotating body 24 that is provided at an end of the rotating shaft 40. Specifically, the actuator 30 controls rotation of the rotating body 24 through current control that is performed by the actuator driver 32 upon receipt of a drive control signal from the controller 10. The actuator 30 may be implemented by a magnetic actuator capable of instantaneously switching the rotation direction of the rotating body 24, such as a rotary solenoid. In addition, the actuator 30 may alternatively implemented by various electric motors such as a brushless motor.

The light emitter 22, the light receiver 26 and the rotating body 24 together constitute an object detector (or object detection unit). The light emitter 22 may include, for example, a laser diode as a light source and emit an infrared laser beam as the irradiated light. Moreover, the light emitter 22 may further include a light source driver (not shown) to drive the laser diode, with a light emission pattern corresponding to a light emission control signal received from the controller 10, to irradiate the laser beam. In addition, the light emitter 22 may include only one light source or a plurality of light sources.

The light receiver 26 may include, for example, only one photodiode as a light receiving element or a plurality of photodiodes as a light receiving element array. The light receiver 26 converts electric current, which corresponds to the amount of light incident on the light receiving element(s), into a voltage and outputs the resultant voltage as a light receiving signal or as digital data to the controller 10.

The rotating body 24 may include, for example, a one-sided mirror. The light emitter 22 and the light receiver 26 are arranged along the rotating shaft 40 so that the laser beam irradiated by the light emitter 22 can be transmitted through the mirror to scan an object within a predetermined range of horizontal azimuth angles. Moreover, the laser beam reflected by the object can be transmitted through the same optical path as the irradiated laser beam and incident on the light receiver 26 through the mirror. As a result, scanning can be performed, within the predetermined azimuth angle range θar, to detect the object.

Alternatively, the rotating body 24 may include no mirror; and the object detection apparatus 100 may include a plurality of light emitters 22 and a plurality of light receivers 26 arranged in an array. In this case, the laser beam is irradiated by the light emitters 22 directly to outside of the object detection apparatus 100 and the reflected laser beam is received directly by the light receivers 26.

In addition, the scanning range or the range of scanning rotation angle of the object detection apparatus 100, i.e., the range within which scanning is performed by the object detector with the irradiated laser beam, may be preferably set to the angle range θar that is less than one revolution, i.e., less than 360°.

The rotation angle detector 50, which is an incremental rotation angle detection apparatus, detects the rotation angle of the rotating body 24 connected to the rotating shaft 40. Hereinafter, the rotation angle detector 50 will also be referred to as the "rotation angle detection apparatus 50".

Figure 2:
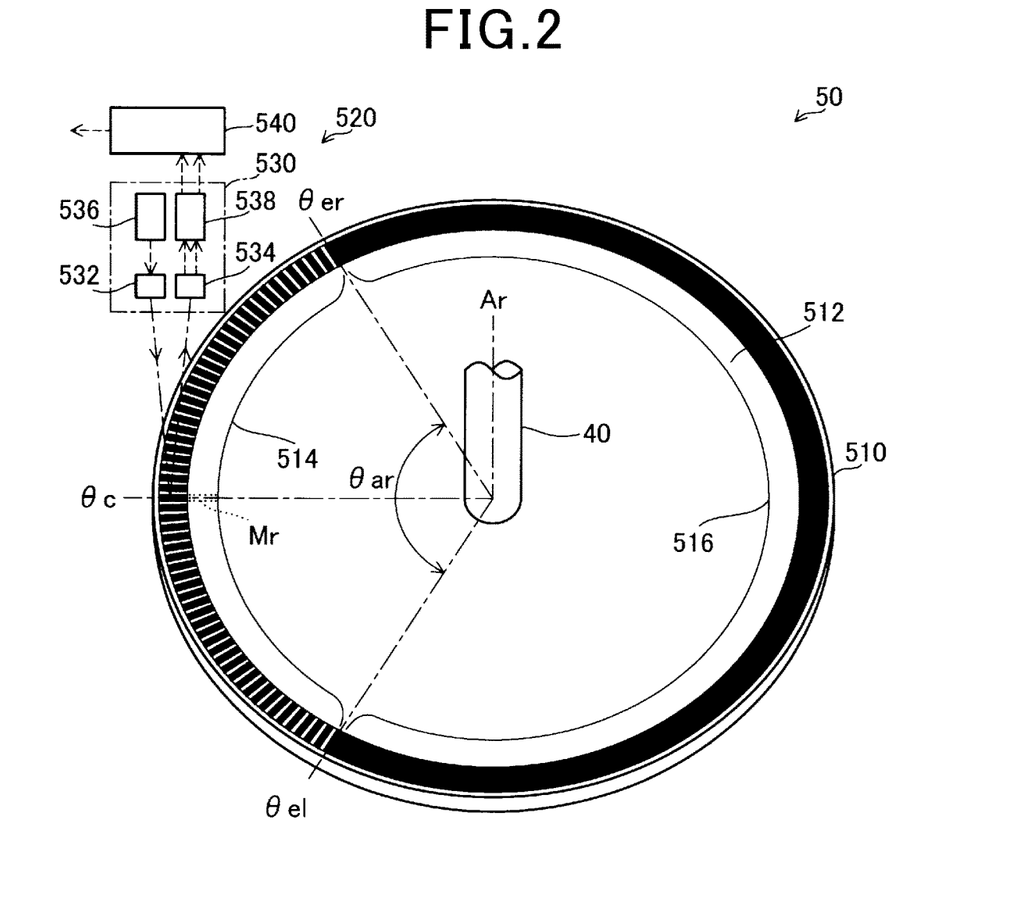
FIG. 2 is a schematic diagram illustrating the configuration of the rotation angle detection apparatus according to the first embodiment.

As shown in FIG. 2, the rotation angle detection apparatus 50 includes a rotary scale 510 and a detector (or detection unit) 520. Moreover, the detector 520 includes a rotation angle sensor 530 and a detection processor (or detection processing unit) 540. The detection processor 540 detects the rotation angle of the rotating body 24 based on detection signals of two phases (i.e., A and B phases) outputted from the rotation angle sensor 530.

The rotary scale 510 has both a detection region 514 and a non-detection region 516 on an annular area at an outer peripheral edge of a disk surface 512 that is perpendicular to a central axis Ar of the rotary scale 510. The detection region 514 corresponds to the angle range θar from a left end angle θel to a right end angle θer, whereas the non-detection region 516 corresponds to an angle range other than the angle range θar. In the detection region 514, there is formed, along the circumferential direction, a scale for detecting the rotation angle θr of the rotating body 24. The scale of the detection region 514 is a scale in which reflective portions (i.e., white portions in FIG. 2) capable of reflecting the irradiated light are formed alternately in the circumferential direction with non-reflective portions (i.e., black portions in FIG. 2) not capable of reflecting the irradiated light. On the other hand, in the non-detection region 516, there is formed only a non-reflective portion or only a reflective portion over the entire circumferential range of the non-detection region 516. More particularly, in the present embodiment, there is formed only a non-reflective portion in the non-detection region 516.

In the present embodiment, a scale (shown with dashed lines in FIG. 2) dedicated for detection of a reference angle θc is omitted from the rotary scale 510. That is, the rotary scale 510 has no scale dedicated for detection of the reference angle θc. In addition, the rotary scale 510 is an incremental rotary scale.

The rotary scale 510 is connected to the rotating shaft 40 so as to rotate together with the rotating shaft 40 with a central axis of the rotating shaft 40 coinciding with the central axis Ar of the rotary scale 510. Moreover, the rotary scale 510 is connected to the rotating shaft 40 so that the detection region 514 of the rotary scale 510 coincides with the range of the rotation angle of the rotating body 24.

The rotation angle sensor 530 includes a light emitter (or light emitting unit) 532, a light receiver (or light receiving unit) 534, a light emission driver (or light emission driving unit) 536 that drives the light emitter 532, and a conversion processor (or conversion processing unit) 538 that converts a light receiving signal, which is an electrical signal outputted from the light receiver 534, into a detection signal.

The light emitter 532 may include, for example, a Light Emitting Diode (LED) as a light source. Upon application of a predetermined voltage thereto by the light emission driver 536, the light emitter 532 irradiates light, the amount of which depends on the applied voltage, to the rotary scale 510. In addition, the light emitter 532 may be constituted of only one LED or a plurality of LEDs.

The light receiver 534 may include, for example, a pair of photodiodes constituting A-phase and B-phase light receiving elements, or a plurality of pairs of photodiodes constituting A-phase and B-phase light receiving element arrays. The light irradiated by the light emitter 532 on the rotary scale 510 is reflected by the detection region 514 of the rotary scale 510; and the reflected light is incident on the light receiving elements of the light receiver 534. The light receiver 534 converts electric currents, which are generated according to the amount of the optical signal (i.e., the reflected light) incident on the light receiving elements of the light receiver 534, into voltages and outputs the resultant voltages as light receiving signals to the conversion processor 538. The amount of the optical signal incident on the light receiver 534 as an input signal periodically changes according to change in the position of the scale of the detection region 514. Therefore, the light receiver 534 outputs both the A-phase and B-phase light receiving signals according to the periodic change of the optical signal.

Figure 3:
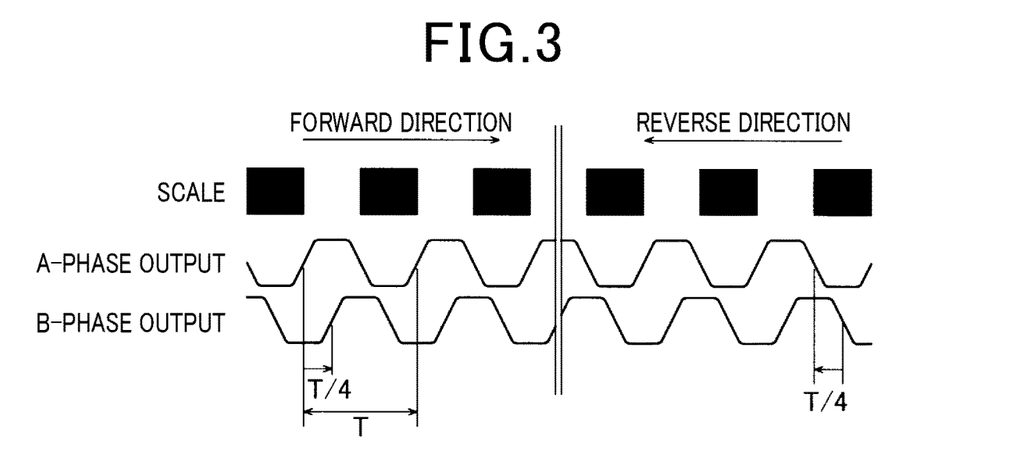
FIG. 3 is a schematic diagram illustrating both A-phase and B-phase detection signals outputted from a rotation angle sensor of the rotation angle detection apparatus according to the first embodiment.

As shown in FIG. 3, the conversion processor 538 converts the A-phase and B-phase light receiving signals outputted from the light receiver 534 into pulsed A-phase and B-phase detection signals and outputs the resultant detection signals. In the present embodiment, the A-phase and B-phase light-receiving elements or light-receiving element arrays are arranged so that the B-phase detection signal is offset in phase from the A-phase detection signal by T/4, where T is the period of the A-phase detection signal. Specifically, as shown in FIG. 3, when the rotation direction is the forward direction (e.g., the clockwise direction in FIG. 2: also referred to as the "right rotation direction" hereinafter), the B-phase detection signal lags the A-phase detection signal by T/4. On the other hand, when the rotation direction is the reverse direction (e.g., the counterclockwise direction in FIG. 2; also referred to as the "left rotation direction" hereinafter), the B-phase detection signal leads the A-phase detection signal by T/4.

In addition, the detection signals are not limited to the pulsed periodic signals. For example, the detection signals may alternatively be sinusoidal or triangular periodic signals.

The detection processor 540 detects the rotation direction of the rotating body 24 based on the aforementioned phase relationship between the A-phase detection signal and the B-phase detection signal. Moreover, the number of the graduations (i.e., the number of the reflective and non-reflective portions) of the scale of the detection region 514 within the angle range θar is a known number set in advance; and the number of the graduations of the scale of the detection region 514 between the left end angle θel or the right end angle θer and the reference angle θc between the two angles θel and θer is also a known number set in advance. Therefore, in the present embodiment, the detection processor 540 detects the current rotation angle θr of the rotating body 24 by counting the number of pulses in the A-phase or B-phase detection signal; the pulses are generated due to change in the rotation angle θr between the position of the left end angle θel and the position of the right end angle θer of the detection region 514 shown in FIG. 2. Further, the detection processor 540 detects the position of the reference angle θc by counting the number of pulses in the A-phase or B-phase detection signal, which are generated due to change in the rotation angle θr from the left end angle θel or the right end angle θer, and detecting the rotation angle θr at which the counted number of the pulses becomes equal to a number corresponding to the reference angle θc.

As described above, in the present embodiment, with the rotary scale 510 having no scale dedicated for detection of the reference angle θc, the rotation angle detection apparatus 50 can detect the rotation angle θr of the rotating body 24 within the angle range θar, the position of the reference angle θc, and the position of the rotation angle θr with respect to the reference angle θc. Consequently, it becomes possible to detect both the rotation angle θr and the reference angle θc with a compact and low-cost configuration.

Figure 4:
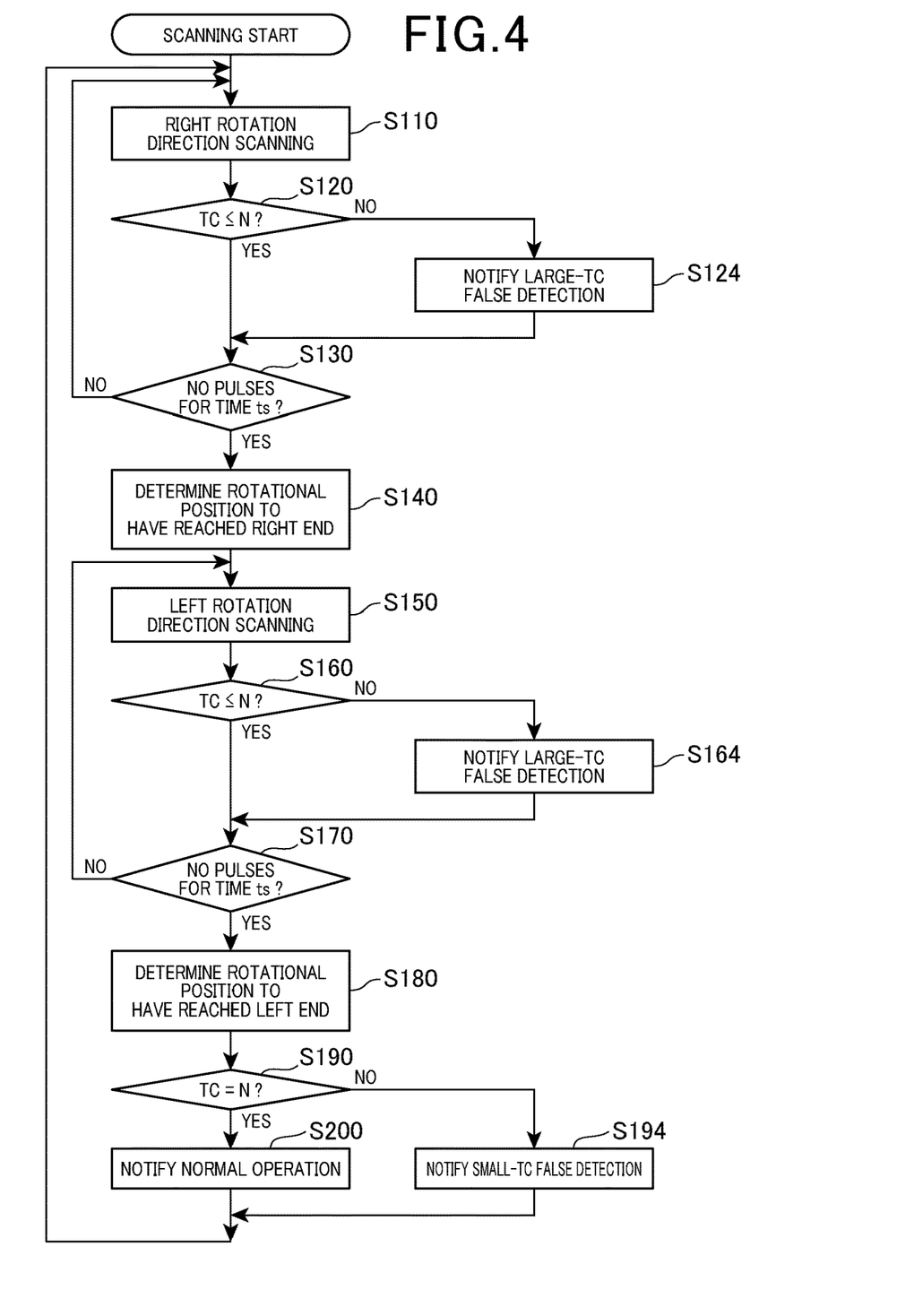
FIG. 4 is a flow chart illustrating an exemplary self-diagnosis process of the rotation angle detection apparatus according to the first embodiment.

Furthermore, in the present embodiment, the detection processor 540 performs a self-diagnosis process as shown in FIG. 4. In this self-diagnosis process, the detection processor 540 diagnoses whether the rotation angle detection operation of the rotation angle detection apparatus 50 performed during a scanning process is normal or abnormal; in the scanning process, the rotation direction of the rotating body 24 (see FIG. 1) is switched alternately between the right rotation direction and the left rotation direction.

Specifically, in the self-diagnosis process, first, the right rotation direction scanning (step S110) is repeated with the actuator 30 being driven by the actuator driver 32 under control of the controller 10 (see FIG. 1), until no pulses are generated for a predetermined time ts (step S130: NO).

During the right rotation direction scanning, the detection processor 540 detects the rotation angle θr in the right rotation direction by counting the number of pulses in a detection signal (i.e., either the A-phase detection signal or the B-phase detection signal) outputted from the rotation angle sensor 530.

In addition, the predetermined time ts is set to a time during which the rotational position of the rotating body 24 can be determined to have reached an end of the detection region 514 (see FIG. 2), i.e., the right end corresponding to the right end angle θer or the left end corresponding to the left end angle θel.

Moreover, during the repetition of the right rotation direction scanning (step S110), the detection processor 540 determines whether the pulse count TC is less than or equal to a predetermined number N (step S120). If TC>N (step S120: NO), the detection processor 540 notifies the controller 10 of a false detection where the pulse count TC is excessively large (step S124). In addition, the predetermined number N is set to a pulse number corresponding to the number of the graduations of the scale of the detection region 514 which has been known.

If no pulses are generated for the predetermined time ts (step S130: YES), the detection processor 540 determines that the rotation angle θr becomes the right end angle θer and thus the rotational position of the rotating body 24 has reached the right end of the detection region 514 (step S140). Then, based on the determination by the detection processor 540, the controller 10 switches the scanning direction from the right rotation direction to the left rotation direction.

The left rotation direction scanning (step S150) is repeated with the actuator 30 being driven by the actuator driver 32 under control of the controller 10, until no pulses are generated for the predetermined time ts (step S170: NO).

During the left rotation direction scanning, the detection processor 540 detects the rotation angle θr in the left rotation direction by counting the number of pulses in the detection signal outputted from the rotation angle sensor 530.

Moreover, during the repetition of the left rotation direction scanning (step S150), the detection processor 540 determines whether the pulse count TC is less than or equal to the predetermined number N (step S160). If TC>N (step S160: NO), the detection processor 540 notifies the controller 10 of a false detection where the pulse count TC is excessively large (step S164).

If no pulses are generated for the predetermined time ts (step S170: YES), the detection processor 540 determines that the rotation angle θr becomes the left end angle θel and thus the rotational position of the rotating body 24 has reached the left end of the detection region 514 (step S180).

Then, the detection processor 540 determines whether the pulse count TC is equal to the predetermined number N (step S190). If TC<N (step S190: NO), the detection processor 540 notifies the controller 10 of a false detection where the pulse count TC is excessively small (step S194). On the other hand, if TC=N (step S190: YES), the detection processor 540 notifies the controller 10 that the rotation angle detection operation is normal (step S200).

Thereafter, based on the determination by the detection processor 540 in step S180, the controller 10 switches the scanning direction from the left rotation direction to the right rotation direction and the right rotation direction scanning (step S110) is repeated again.

With the above-described self-diagnosis process shown in FIG. 4 which is performed during the rotation angle detection operation, when the number of pulses detected during the scanning of the rotating body 24 within the angle range from one end to the other end thereof is not equal to the known number, the detection processor 540 can notify the controller 10 of a false detection of the rotation angle. Then, the control unit 10 can determine whether the operation of the rotation angle detection apparatus 50 is normal or abnormal based on the notification of the false detection received from the rotation angle detection apparatus 50 (i.e., the rotation angle detector 50).

For example, in cases where the false detection is highly probably caused by noise and it is highly probable that the detection operation can be returned to the normal operation, such as in the case of the false detection being notified only once, it is possible to keep the object detection apparatus 100 operating without being stopped. On the other hand, in cases where the false detection is caused by a physical defect (e.g., dust or water droplets adhering to the rotary scale 510) and it is highly probable that the detection operation cannot be returned to the normal operation, such as in the case of false detections of the same type (e.g., small pulse-count false detections or large pulse-count false detections) being notified a plurality of times, it is possible to diagnose the rotation angle detection apparatus 50 as being in a fault state and stop the operation of the object detection apparatus 100.

In the above-described self-diagnosis process shown in FIG. 4, the rotation angle detection apparatus 50 only notifies the controller 10 of the false detection; and the diagnosis as to whether the rotation angle detection apparatus 50 is in a fault state is performed by the superordinate controller 10 based on the notification of the false detection received from the rotation angle detection apparatus 50. Alternatively, the rotation angle detection apparatus 50 may perform, instead of the self-diagnosis process shown in FIG. 4, a self-diagnosis process shown in FIG. 5 which includes steps for diagnosing whether the rotation angle detection apparatus 50 is in a fault state.

Figure 5:
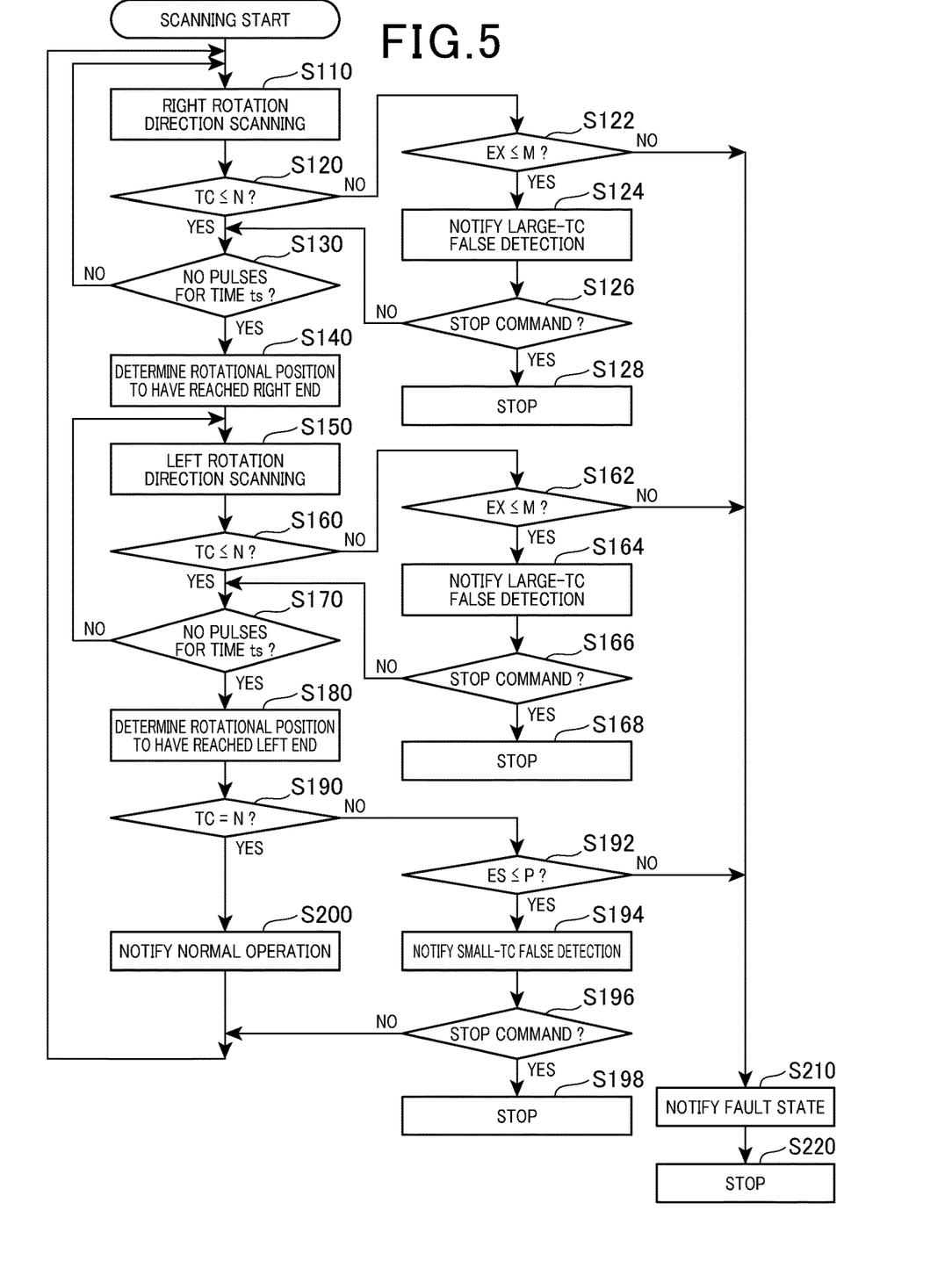
FIG. 5 is a flow chart illustrating another exemplary self-diagnosis process of the rotation angle detection apparatus according to the first embodiment.

Compared to the self-diagnosis process shown in FIG. 4, the self-diagnosis process shown in FIG. 5 further includes: step S122 before step S124 and steps S126 and S128 after step S124; step S162 before step S164 and steps S166 and S168 after step S164; step S192 before step S194 and steps S196 and S198 after step S194; and steps S210 and S220. These added steps will be described in detail hereinafter.

In step S122, the detection processor 540 determines whether the number EX of false detections where TC>N is less than or equal to a predetermined number M. If EX≤M (step S122: YES), the detection processor 540 notifies the controller 10 of a false detection where the pulse count TC is excessively large (step S124). Moreover, if there is a stop command sent from the controller 10 in response to the notification of the false detection (step S126: YES), the detection processor 540 stops the rotation angle detection operation (step S128). On the other hand, if EX>M (step S122: NO), the detection processor 540 diagnoses the rotation angle detection apparatus 50 as being in a fault state and notifies the controller 10 of the fault state (step S210). Then, the detection processor 540 stops the operation of the rotation angle detection apparatus 50 (step S220). Further, upon receipt of the notification of the fault state, the controller 10 stops the rotational operation of the rotating body 24.

Steps S162, S166 and S168 are the same as steps S122, S126 and S128 described above. Therefore, explanation of steps S162, S166 and S168 is omitted hereinafter.

In step S192, the detection processor 540 determines whether the number ES of false detections where TC<N is less than or equal to a predetermined number P. In addition, the predetermined number P may be set such that P≤M or such that P≥M. If ES≤P (step S192: YES), the detection processor 540 notifies the controller 10 of a false detection where the pulse count TC is excessively small (step S194). Moreover, if there is a stop command sent from the controller 10 in response to the notification of the false detection (step S196: YES), the detection processor 540 stops the rotation angle detection operation (step S198). On the other hand, if ES>P (step S192: NO), the detection processor 540 diagnoses the rotation angle detection apparatus 50 as being in a fault state and notifies the controller 10 of the fault state (step S210). Then, the detection processor 540 stops the operation of the rotation angle detection apparatus 50 (step S220). Further, upon receipt of the notification of the fault state, the controller 10 stops the rotational operation of the rotating body 24.

With the above-described self-diagnosis process shown in FIG. 5, when false detections of the same type (e.g., small pulse-count false detections or large pulse-count false detections) have occurred a plurality of times, the detection processor 540 can diagnose the fault state of the rotation angle detection apparatus 50 and notify the controller 10 of the fault state.

In addition, in the present embodiment, the detection processor 540 is included in the detector 520 of the rotation angle detection apparatus 50 (see FIG. 2). However, the detection processor 540 may alternatively be included in the controller 10.

Second Embodiment

In the above-described first embodiment, the light emitter 532 of the rotation angle detection apparatus 50 (see FIG. 2) is configured to irradiate light on the detection region 514 of the rotary scale 510 upon application of a predetermined voltage by the light emission driver 536 to the light emitter 532; the amount of the irradiated light depends on the applied voltage.

In contrast, the light emission driver 536 may automatically control the light emission of the light emitter 532 by controlling the voltage applied to the light emitter 532 so as to have the amount of light actually received by the light receiver 534 within a predetermined range. This automatic control of the amount of light emitted by the light emitter is also referred to as APC (Automatic Power Control). In addition, the APC may be implemented not only by methods of automatically controlling the amount of light emitted by the light emitter, but also by methods of automatically controlling the photosensitivity (or gain) of the light receiver.

In the case of controlling the amount of light emitted by the light emitter 532 by APC, with the rotary scale 510 described in the first embodiment where there is formed only a non-reflective portion (or alternatively only a reflective portion) over the entire non-detection region 516 (see FIG. 2), the rotation angle detection operation may become unstable.

For example, in the case of the non-detection region 516 having only one non-reflective portion formed over the entire circumferential range thereof, when the rotation angle of the rotating body 24 is at either end of the angle range θar, the detected amount of the emitted light is kept small equally for both the A and B phases; therefore, the amount of the emitted light is controlled by APC so as to be increased. In this case, if the rotation angle detection is performed by the rotation angle detection apparatus 50 with rotation of the rotating body 24 after the amount of the emitted light is increased by APC, the amount of light received by the light receiver 534 may become saturated, causing failure in the operation of detecting change in the amount of light due to the reflection and non-reflection. On the other hand, in the case of the non-detection region 516 having only one reflective portion formed over the entire circumferential range thereof, when the rotation angle of the rotating body 24 is at either end of the angle range θar, the detected amount of the emitted light is kept large; therefore, the amount of the emitted light is controlled by APC so as to be decreased. In this case, if the rotation angle detection is performed by the rotation angle detection apparatus 50 with rotation of the rotating body 24 after the amount of the emitted light is suppressed by APC, the amount of light received by the light receiver 534 may become insufficient, causing failure in the operation of detecting change in the amount of light due to the reflection and non-reflection.

Figure 6:
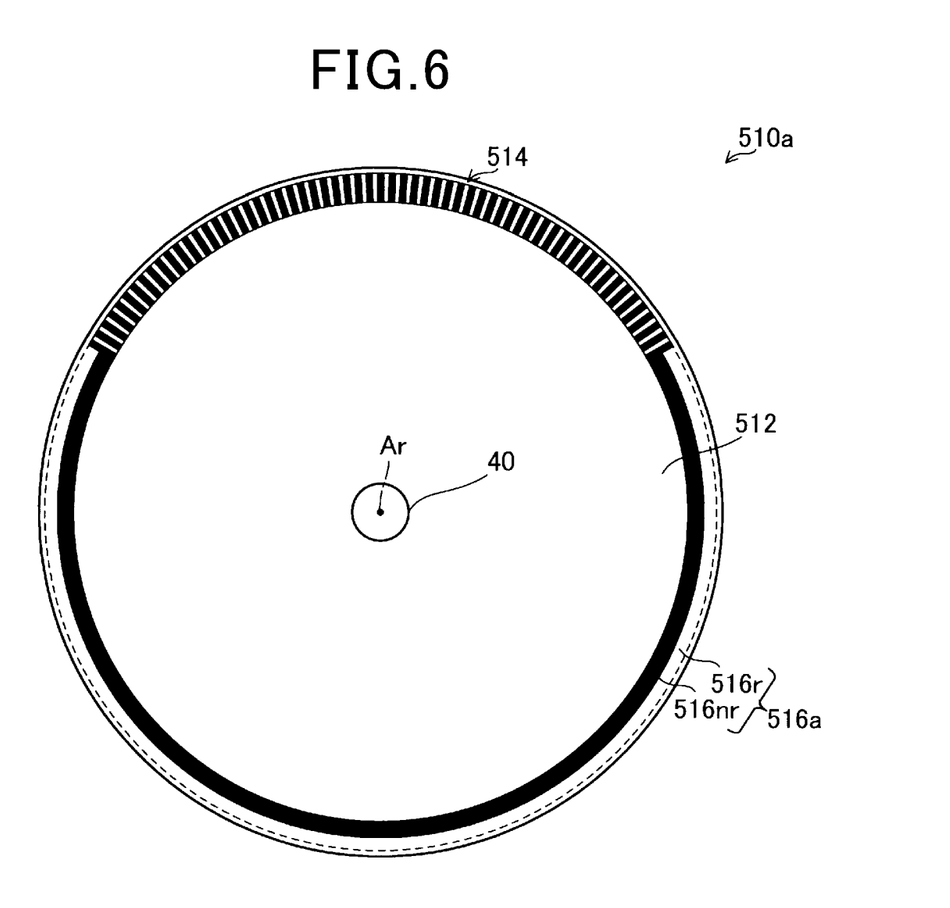
FIG. 6 is a schematic diagram illustrating the configuration of a rotary scale according to a second embodiment.

In view of the above, according to the second embodiment, there is provided a rotary scale 510a as shown in FIG. 6, which is suitable for use in the case of performing APC.

Compared to the rotary scale 510 according to the first embodiment (see FIG. 2), the rotary scale 510a according to the present embodiment differs in that the non-detection region 516 is replaced with a non-detection region 516a.

The non-detection region 516a has both a non-reflective portion 516nr formed on the radially inner side (or inner peripheral side) and a reflective portion 516r formed on the radially outer side (or outer peripheral side). The radial widths of the non-reflective portion 516nr and the reflective portion 516r are set so that: without APC, the amount of the reflected light of the light irradiated to either end of the non-detection region 516a, which is received by the light receiver 534, is substantially equal to ½ of the difference in the amount of light between the reflective portions and the non-reflective portions of the detection region 514 and substantially equal for both the A phase and the B phase; and the areas of the non-reflective portion 516nr and the reflective portion 516r per unit angle are substantially equal to each other. In addition, the non-detection region 516a may alternatively have a reflective portion 516r formed on the radially inner side and a non-reflective portion 516nr formed on the radially outer side.

With the above configuration of the non-detection region 516a, when APC is performed, it is possible to prevent the amount of light received by the light receiver 534 from becoming saturated or insufficient due to the APC, thereby preventing failure from occurring in the operation of detecting change in the amount of light caused by the reflection and non-reflection.

Figure 7:
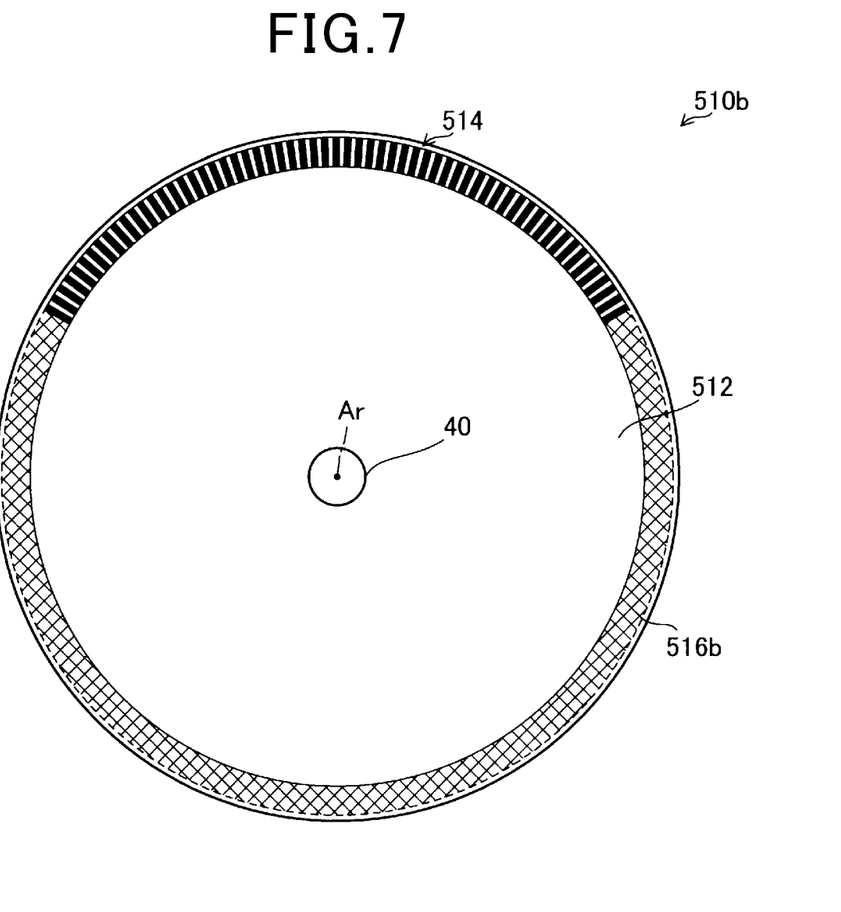
FIG. 7 is a schematic diagram illustrating the configuration of another rotary scale according to the second embodiment.

FIG. 7 shows another rotary scale 510b according to the second embodiment, which is also suitable for use in the case of performing APC.

The rotary scale 510b includes a non-detection region 516b which has only one intermediately-reflective (or semi-reflective) portion formed thereon; the amount of light reflected by the intermediately-reflective portion is substantially equal to ½ of the difference in the amount of light between the reflective portions and the non-reflective portions of the detection region 514. That is, the non-detection region 516b is configured so that the amount of the reflected light of the light irradiated to either end of the non-detection region 516b is substantially equal to ½ of the difference between the maximum amount of light and the minimum amount of light in the detection region 514 and substantially equal for both the A phase and the B phase.

In addition, it should be noted that the expression "substantially equal" is not limited to "exactly equal", but includes a difference to the extent that there is no operational problem if it is treated as "exactly equal".

Third Embodiment

In the rotary scale 510 according to the first embodiment (see FIG. 2), both the detection region 514 and the non-detection region 516 are formed on the disk surface 512 that is perpendicular to the central axis Ar of the rotary scale 510.

Figure 8:
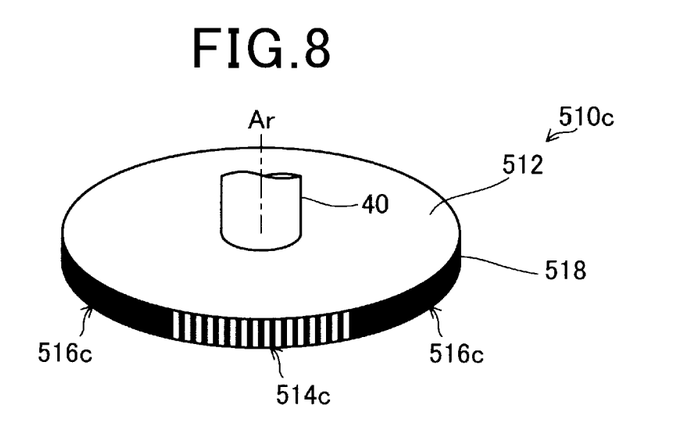
FIG. 8 is a schematic diagram illustrating the configuration of a rotary scale according to a third embodiment.

In contrast, as shown in FIG. 8, in a rotary scale 510c according to the third embodiment, both a detection region 514c and a non-detection region 516c are formed on a side surface 518 of the rotary scale 510c; the side surface 518 is a curved surface extending around the central axis Ar of the rotary scale 516c and along the circumferential direction of the rotary scale 516c.

With the above rotary scale 510c according to the present embodiment, it is also possible to achieve the same advantageous effects as achievable with the rotary scale 510 according to the first embodiment.

In addition, although not shown in the drawings, the non-detection region 516c of the rotary scale 510c according to the present embodiment may alternatively have the same configuration as the non-detection region 516a of the rotary scale 510a or the non-detection region 516b of the rotary scale 510b according to the second embodiment.

Fourth Embodiment

In the rotary scale 510 according to the first embodiment, there is formed only one detection region 514 (see FIG. 2).

Figure 9:
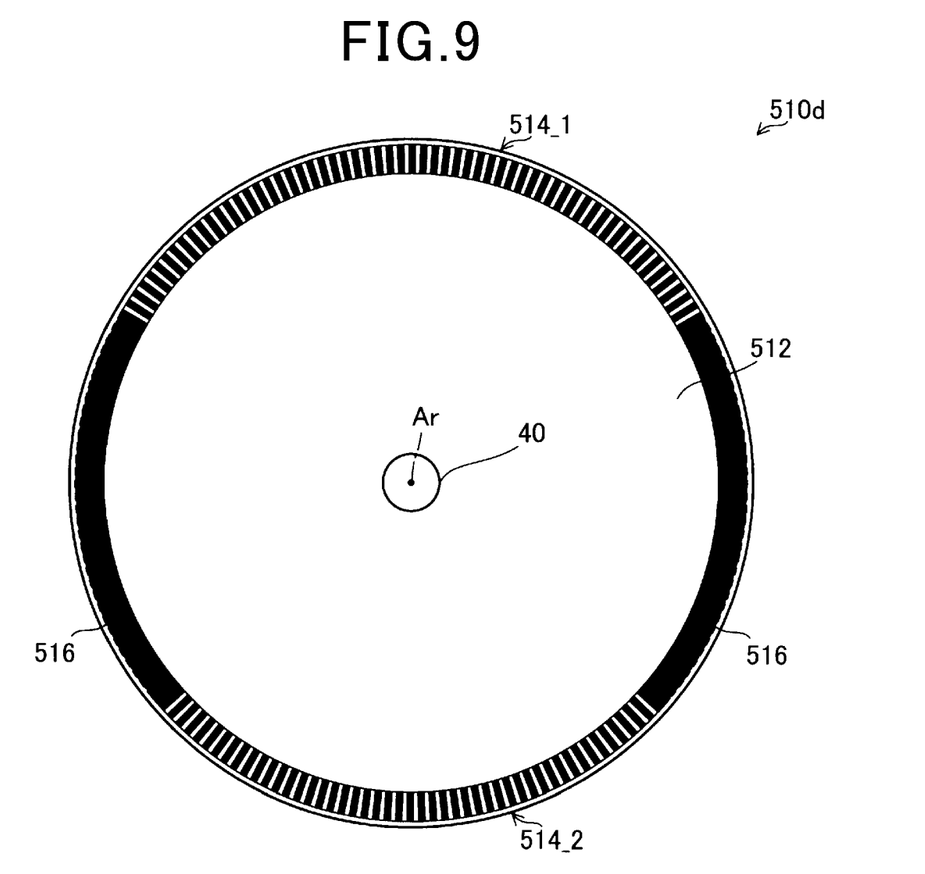
FIG. 9 is a schematic diagram illustrating the configuration of a rotary scale according to a fourth embodiment.

In contrast, as shown in FIG. 9, a rotary scale 510d according to the fourth embodiment has a plurality of detection regions 514, more particularly two detection regions 514_1 and 514_2. The two detection regions 514_1 and 514_2 are offset from each other by, for example, 180°. Moreover, the angle ranges of the two detection regions 514_1 and 514_2 are set to be equal to each other. In addition, it should be noted that the angle ranges of the two detection regions 514_1 and 514_2 may alternatively be set to be different from each other.

With the above rotary scale 510d according to the present embodiment, it is also possible to achieve the same advantageous effects as achievable with the rotary scale 510 according to the first embodiment.

Moreover, with the above rotary scale 510d according to the present embodiment, it is possible to detect not only the rotation angle (or the angle of rotational movement) of an object that rotationally reciprocates within a predetermined angle range, but also the rotation angle of a rotating object. In addition, in this case, in the non-detection regions, the operation of the actuator may be controlled based on estimation from the angle information acquired in the detection regions.

In addition, although not shown in the drawings, each of the rotary scales 510a and 510b according to the second embodiment and the rotary scale 510c according to the third embodiment may also be modified to have a plurality of detection regions 514 formed therein.

Fifth Embodiment

The rotation angle detection apparatus 50 according to the first embodiment includes the rotary scale 510 which is a light reflection type rotary scale (see FIG. 2).

Figure 10:
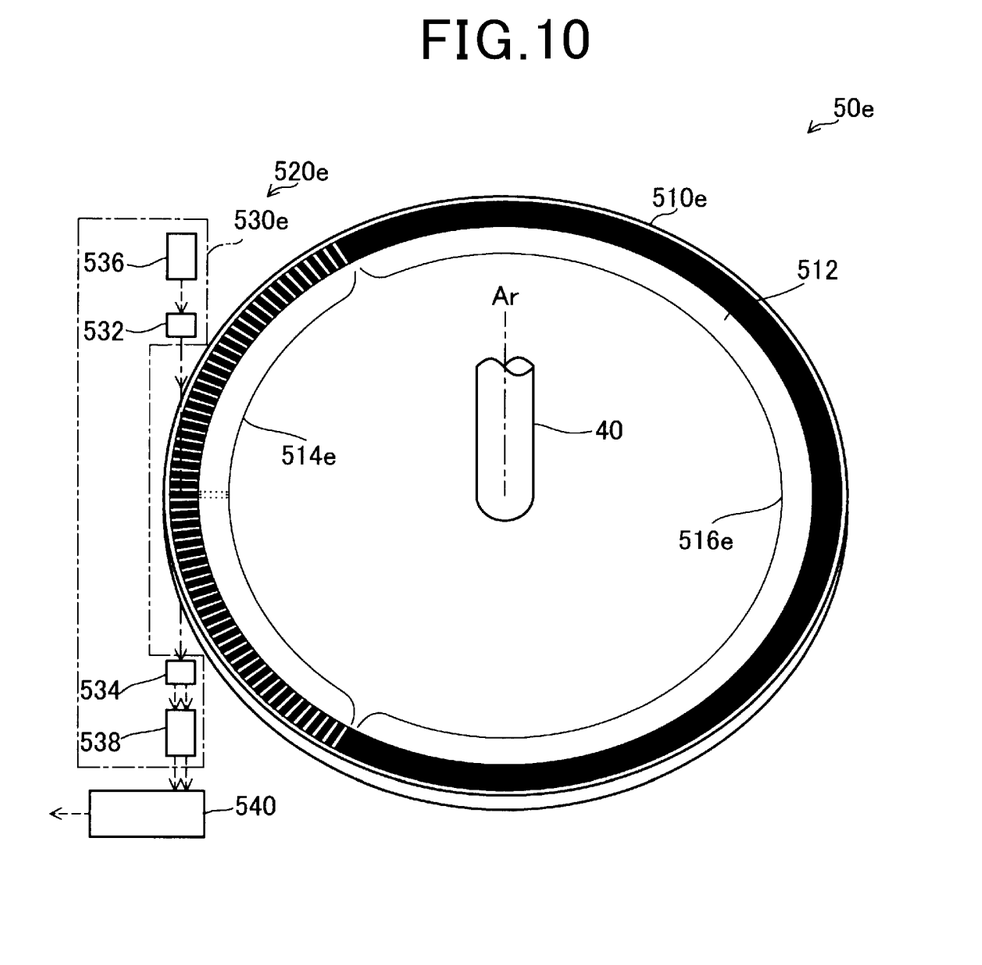
FIG. 10 is a schematic diagram illustrating the configuration of a rotation angle detection apparatus according to a fifth embodiment.

In contrast, as shown in FIG. 10, a rotation angle detection apparatus 50e according to the fifth embodiment includes a light transmission type rotary scale 510e.

Moreover, in the present embodiment, the rotation angle detection apparatus 50e further includes a detector 520e in addition to the rotary scale 510e.

As shown in FIG. 10, the light transmission type rotary scale 510e includes both a detection region 514e having a scale formed therein and a non-detection region 516e sandwiching the detection region 514e and having no scale formed therein. The scale of the detection region 514e is a scale in which transmitting portions (i.e., white portions in FIG. 10) are formed alternately in the circumferential direction with non-transmitting portions (i.e., black portions in FIG. 10). The transmitting portions allow the irradiated light to be transmitted therethrough, whereas the non-transmitting portions block the irradiated light from transmitting therethrough. On the other hand, in the non-detection region 516e, there is formed only a non-transmitting portion or only a transmitting portion over the entire circumferential range of the non-detection region 516e. More particularly, in the present embodiment, there is formed only a non-transmitting portion in the non-detection region 516e.

In the present embodiment, the detector 520e includes a rotation angle sensor 530e instead of the rotation angle sensor 530 described in the first embodiment (see FIG. 2). The rotation angle sensor 530e includes a light emitter 532 and a light receiver 534 that are arranged to have the rotary scale 510e sandwiched therebetween. Consequently, of the light irradiated from the light emitter 532 on the rotary scale 510e, only the light which has transmitted through the transmitting portions of the rotary scale 510e is received by the light receiver 534.

With the rotation angle detection apparatus 50e according to the present embodiment, it is also possible to achieve the same advantageous effects as achievable with the rotation angle detection apparatus 50 according to the first embodiment.

In addition, as described above, in the present embodiment, the non-detection region 516e of the rotary scale 510e is configured to have only a non-transmitting portion or only a transmitting portion formed therein over the entire circumferential range thereof. However, the non-detection region 516e may alternatively be configured to have both a non-transmitting portion and a transmitting portion formed therein; one of the non-transmitting portion and the transmitting portion is formed on the radially inner side while the other of the non-transmitting portion and the transmitting portion is formed on the radially outer side. With this alternative configuration of the non-detection region 516e, it is possible to prevent detection failure from occurring due to APC as described in the second embodiment.

Sixth Embodiment

The rotation angle detection apparatus 50 according to the first embodiment includes the rotary scale 510 which is a light reflection type rotary scale (see FIG. 2).

Figure 11:
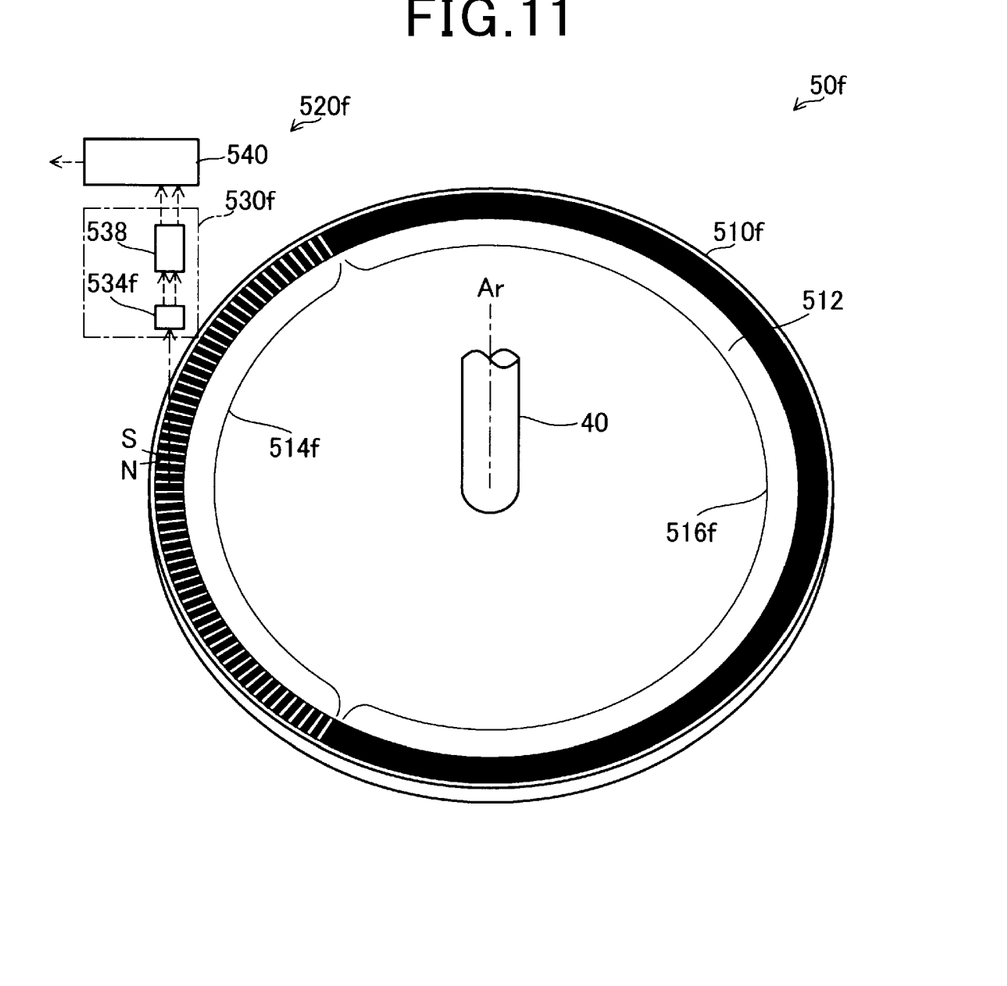
FIG. 11 is a schematic diagram illustrating the configuration of a rotation angle detection apparatus according to a sixth embodiment.

In contrast, as shown in FIG. 11, a rotation angle detection apparatus 50f according to the sixth embodiment includes a magnetic rotary scale 510f.

Moreover, in the present embodiment, the rotation angle detection apparatus 50f further includes a detector 520f in addition to the rotary scale 510f.

As shown in FIG. 11, the magnetic rotary scale 510f includes both a detection region 514f having a scale formed therein and a non-detection region 516f sandwiching the detection region 514f and having no scale formed therein. The scale of the detection region 514f is a scale in which N-pole portions (i.e., white portions in FIG. 11) are formed alternately in the circumferential direction with S-pole portions (i.e., black portions in FIG. 11). Each of the N-pole portions is magnetized into an N pole, whereas each of the S-pole portions is magnetized into an S pole. On the other hand, in the non-detection region 516f, there is formed only an N-pole portion or only an S-pole portion over the entire circumferential range of the non-detection region 516f. More particularly, in the present embodiment, there is formed only an S-pole portion in the non-detection region 516f.

In the present embodiment, the detector 520f includes a rotation angle sensor 530f instead of the rotation angle sensor 530 described in the first embodiment (see FIG. 2). The rotation angle sensor 530f includes a magnetic sensor 534f that is configured to detect change in a magnetic field whose strength periodically changes according to change in the position of the scale of the detection region 514f.

With the rotation angle detection apparatus 50f according to the present embodiment, it is also possible to achieve the same advantageous effects as achievable with the rotation angle detection apparatus 50 according to the first embodiment.

In addition, as described above, in the present embodiment, the non-detection region 516f of the rotary scale 510f is configured to have only an N-pole portion or only an S-pole portion formed therein over the entire circumferential range thereof. However, the non-detection region 516f may alternatively be configured to have only a nonmagnetic portion formed therein over the entire circumferential range thereof; the nonmagnetic portion is not magnetized into any magnetic pole. With this alternative configuration of the non-detection region 516f, it is possible to prevent detection failure from occurring due to APC as described in the second embodiment.

Moreover, the detection region 514c and the non-detection region 516c of the rotary scale 510c according to the third embodiment may be modified to have the same configuration as the detection region 514f and the non-detection region 516f of the rotary scale 510f according to the present embodiment.

While the above particular embodiments have been shown and described, it will be understood by those skilled in the art that various modifications, changes and improvements may be made without departing from the spirit of the present disclosure.

(1) For example, in the rotary scales according to the above-described embodiments, the non-detection regions are formed over the entire angle range except for the angle range corresponding to the detection regions in one round (i.e. 360°). However, the non-detection regions may alternatively be formed, within only part of the entire angle range except for the angle range corresponding to the detection regions, so as to adjoin the detection regions in the circumferential direction.

(2) The rotary scales according to the above-described embodiments are disk-shaped. However, the rotary scales may alternatively have other shapes such that the detection and non-detection regions can be formed along the circumferential direction (or rotational direction) of the rotary scales. For example, the rotary scales may alternatively be fan-shaped.

(3) In steps S130 and S160 of the self-diagnosis processes shown in FIGS. 4 and 5, a determination is made as to whether no pulses are generated for the predetermined time ts; if the determination results in a "YES" answer, the detection processor 540 determines that the rotational position of the rotating body 24 has reached the left end of the detection region corresponding to the left end angle θel or the right end of the detection region corresponding to the right end angle θer.

As an alternative, a determination may be made as to whether no pulses are generated for a time whose length is X times the period of the pulses generated with rotation of the rotary scale, where 0<X<2; and the detection processor 540 may determine, upon the determination resulting in a "YES" answer, that the rotational position of the rotating body 24 has reached the left end or the right end of the detection region.

As another alternative, a determination may be made as to whether both the output of the A-phase detection signal and the output of the B-phase detection signal are at a low level corresponding to the non-reflective portions of the rotary scale; and the detection processor 540 may determine, upon the determination resulting in a "YES" answer, that the rotational position of the rotating body 24 has reached the left end or the right end of the detection region.

(4) In the above-described embodiments, the rotation angle detection apparatus is applied to the object detection apparatus 100 (see FIG. 1). However, the rotation angle detection apparatus can also be applied to other apparatuses that rotate an object within a desired rotation angle range, such as a light irradiation apparatus for irradiating light, a spray apparatus for spraying a drug or the like, and imaging apparatus for capturing images of objects or an ambient environment.

In addition, the controllers and the control methods thereof described in the present disclosure may be realized by a dedicated computer that includes a processor and a memory for performing one or more functions embodied by a computer program. As an alternative, the controllers and the control methods thereof described in the present disclosure may be realized by one or more dedicated hardware logic circuits. As another alternative, the controllers and the control methods thereof described in the present disclosure may be realized by a combination of a dedicated computer, which includes a processor and a memory for performing one or more functions embodied by a computer program, and one or more dedicated hardware logic circuits. Moreover, the computer program may be stored, as instructions to be executed by the computer, in a computer-readable non-transitory tangible recording medium.

What is claimed is:

1. A rotation angle detection apparatus for detecting a rotation angle of an object, the rotation angle detection apparatus comprising:

an incremental rotary scale configured to rotate together with the object, the rotary scale including both a detection region and a non-detection region, the detection region being provided along a circumferential direction of the rotary scale and having a scale formed therein for detecting the rotation angle of the object, the non-detection region adjoining the detection region in the circumferential direction and having no scale formed therein; and a detector configured to generate an electrical signal based on an input signal and detect the rotation angle of the object based on the electrical signal, the input signal indicating change in position of the scale of the detection region, the position of the scale of the detection region changing according to change in the rotation angle of the object, the electrical signal periodically changing according to the change in the position of the scale of the detection region, wherein the rotary scale has no scale dedicated for detection of a reference angle for the rotation angle of the object, and the detector is further configured to detect the reference angle by counting the number of positional changes from an end of the scale of the detection region of the rotary scale, the positional changes being indicated by the input signal.

2. The rotation angle detection apparatus as set forth in claim 1, wherein the input signal inputted to the detector comprises an A-phase input signal and a B-phase input signal, and the non-detection region of the rotary scale is configured so that the A-phase and B-phase input signals inputted from the non-detection region to the detector are substantially equal to each other.

3. The rotation angle detection apparatus as set forth in claim 2, wherein the non-detection region of the rotary scale is further configured so that both the A-phase and B-phase input signals inputted from the non-detection region to the detector are substantially equal to ½ of a difference between a maximum value and a minimum value of the A-phase and B-phase input signals inputted from the detection region of the rotary scale to the detector.

4. The rotation angle detection apparatus as set forth in claim 1, wherein the detector is further configured to diagnose, based on the number of cycles of the electrical signal periodically changing with change in the rotation angle of the object, whether detection of the rotation angle by the detector is normal or abnormal.

5. The rotation angle detection apparatus as set forth in claim 1, wherein the input signal is a reflected or transmitted light whose amount periodically changes according to the change in the position of the scale of the detection region, the reflected or transmitted light being a reflected or transmitted light of a light irradiated on the rotary scale.

6. The rotation angle detection apparatus as set forth in claim 1, wherein the input signal is a magnetic field whose strength periodically changes according to the change in the position of the scale of the detection region.

7. The rotation angle detection apparatus as set forth in claim 1, wherein the reference angle is between two angles respectively corresponding to the end and the other end of the scale of the detection region.

\* \* \* \* \*